US008520820B2

(12) United States Patent
Lai

(10) Patent No.: US 8,520,820 B2
(45) Date of Patent: Aug. 27, 2013

(54) CONFERENCE CALL ACCESS

(75) Inventor: Daniel Tai-Nin Lai, Los Altos, CA (US)

(73) Assignee: Cisco Technology, Inc., San Jose, CA (US)

( * ) Notice: Subject to any disclaimer, the term of this patent is extended or adjusted under 35 U.S.C. 154(b) by 1131 days.

(21) Appl. No.: 11/683,316

(22) Filed: Mar. 7, 2007

(65) Prior Publication Data

US 2008/0219426 A1     Sep. 11, 2008

(51) Int. Cl.
*H04M 3/42*     (2006.01)
*H04M 11/00*    (2006.01)
*H04M 1/00*     (2006.01)
*H04L 12/16*    (2006.01)
*H04Q 11/00*    (2006.01)

(52) U.S. Cl.
USPC ............... 379/202.01; 379/93.21; 379/158; 379/204.01; 370/260; 455/416

(58) Field of Classification Search
USPC ............ 379/202.01, 203.01, 204.01, 205.01, 379/206.01, 93.21, 157, 158, 201.01, 207.01, 379/93.01, 90.01; 370/259, 260, 261, 262; 455/414.1, 416
See application file for complete search history.

(56) References Cited

U.S. PATENT DOCUMENTS

| 5,483,588 | A | * | 1/1996 | Eaton et al. ............... 379/202.01 |
| 5,673,393 | A | * | 9/1997 | Marshall et al. ............... 709/226 |
| 2002/0136382 | A1 | * | 9/2002 | Cohen et al. ............. 379/202.01 |
| 2003/0046344 | A1 | * | 3/2003 | Kumhyr et al. ................ 709/205 |
| 2004/0101119 | A1 | * | 5/2004 | Malcolm et al. .......... 379/202.01 |
| 2004/0125933 | A1 | * | 7/2004 | Jun et al. .................. 379/202.01 |
| 2004/0234058 | A1 | * | 11/2004 | Darby et al. ............. 379/202.01 |
| 2005/0063524 | A1 | * | 3/2005 | McKibben et al. ......... 379/88.18 |
| 2005/0108328 | A1 | * | 5/2005 | Berkeland et al. ........ 709/204 |
| 2005/0152523 | A1 | * | 7/2005 | Fellenstein et al. ...... 379/202.01 |
| 2008/0069329 | A1 | * | 3/2008 | Jonasson .................. 379/207.11 |

* cited by examiner

*Primary Examiner* — Khai N Nguyen
(74) *Attorney, Agent, or Firm* — Haynes and Boone LLP

(57) ABSTRACT

A method for facilitating access to a conference call is disclosed. The method can comprise allowing a prospective participant to join the conference call after the prospective participant provides a personal ID rather than a conference ID. The method can comprise using at least one of a prospective participant's personal ID or voice for authentication, accessing the prospective participant's electronic calendar, presenting conference call choices from the prospective participant's electronic calendar to the prospective participant, and adding the prospective participant to a selected conference call.

15 Claims, 3 Drawing Sheets

CONFERENCE CALL ACCESS

TECHNICAL FIELD

The present disclosure relates generally to telephony.

BACKGROUND

The use of conference calls to facilitate meetings is well known. According to contemporary practice, a conference call participant joins a conference call by calling into a conference server. The call may be made using either time division multiplexing (TDM) or Internet Protocol (IP). Upon reaching the conference server, the prospective participant provides a pre-arranged conference ID. After the conference ID has been validated, then the prospective participant joins the conference call. The use of conference ID's facilitates control of the conference call by limiting participation to those who have previously been invited to participate. Such control of conference calls is generally desirable.

However, such contemporary practice necessitates that the prospective participant know the conference ID in order to join the conference call. Every conference call has a unique conference ID. Therefore, a prospective participant must obtain a new conference ID for each conference call. The requirement for such conference ID's can result in substantial inconvenience for conference callers. Indeed, in some instances it may be extremely difficult or impossible for a prospective participant to obtain the required conference ID. For example, when trying to join a conference call while driving, the need for a conference ID can result in an unsafe condition. This may occur, for example, when the driver attempts to write down the conference ID while simultaneously driving an automobile and using the telephone to obtain the conference ID.

DESCRIPTION

Overview

A method and system for facilitating controlled access to conference calls without requiring a one-time conference ID are disclosed. A prospective participant or caller can instead provide a reusable unique personal ID. As an alternative to the personal ID, or in addition thereto, the prospective participant's electronic calendar information can be used to determine if the prospective participant is authorized to join the conference.

Description of Example Embodiments

Particular embodiments facilitate access to a conference call by a prospective participant by allowing the prospective participant to use a personal ID instead of a conference ID to verify that the prospective participant is authorized to join the conference call. The personal ID can be a single ID that the user uses each time that an attempt is made to join a conference call. Thus, instead of having to obtain a different conference ID for each conference call, the user can use the same personal ID over and over again. Of course, reusing the same personal ID is substantially more convenient that having to obtain a new conference ID for each conference call.

Optionally, the conference server can have access to the prospective participant's scheduled conference information. Such conference information can include a list of upcoming conference calls in which the user may desire to participate. The conference information can include the time and date of the conference call, as well as the telephone number for the conference call. Thus, when a prospective participant accesses the conference server, the conference server can present the available conference choices to the prospective participant. In this manner, the prospective participant can join a conference call without looking up and entering the conference ID.

Of course, merely selecting a conference call to participate in is substantially easier and more convenient than trying to obtain the conference ID. Indeed, this simpler procedure can enhance safety, such as when driving. Since the procedure is simple, there can be less distraction when driving.

Figure 1:
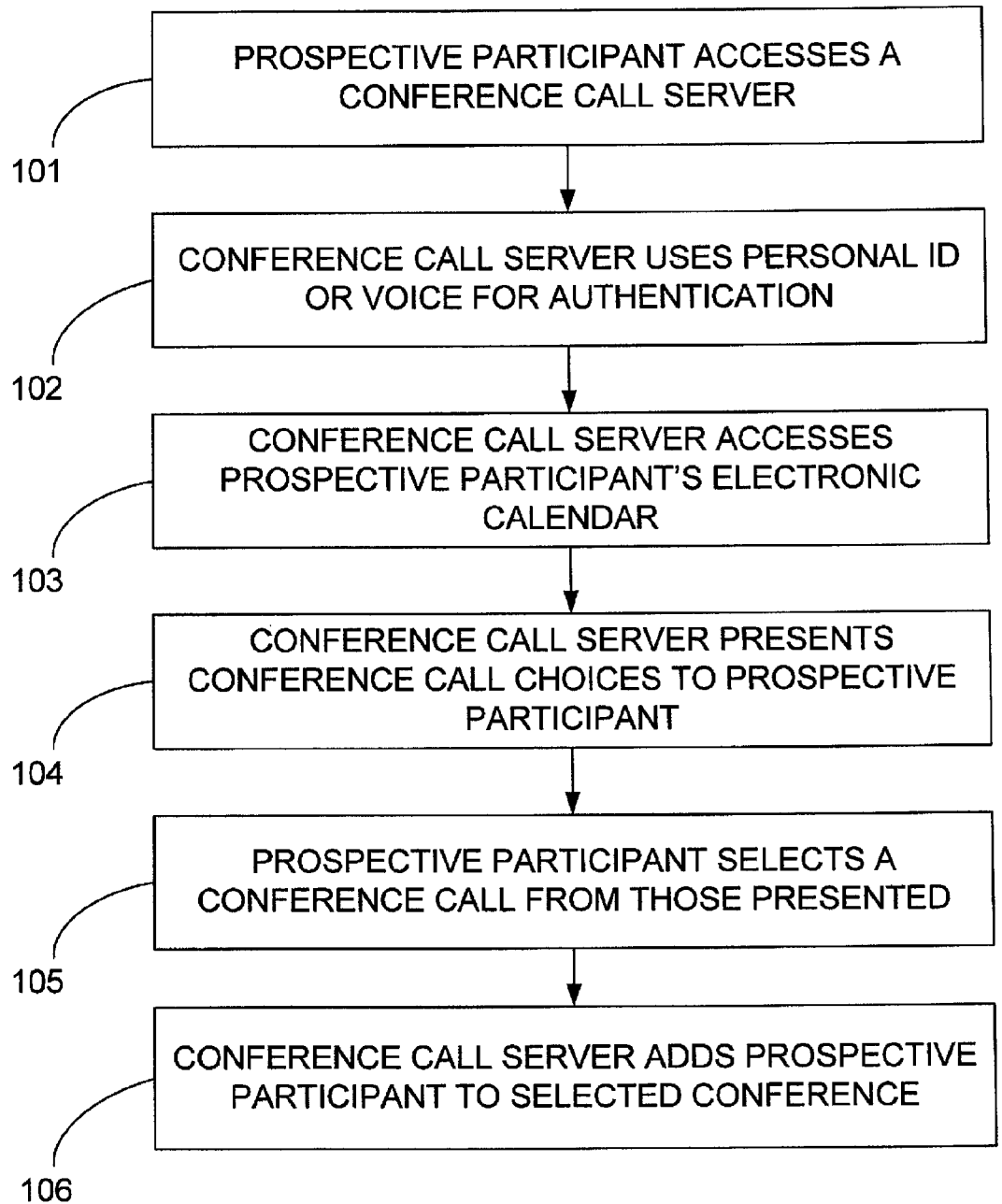
FIG. 1 is a flow chart showing operation according to an example of an embodiment.

Referring now to FIG. 1, a prospective participant in a conference call can access a conference server, as indicated in block 101. The prospective participant can use a unique personal ID, like a personal identification number (PIN), and/or voice authentication, to gain access to the conference server and/or to join the conference call. Any desired type of code, such as numeric codes, word codes, or alpha-numeric codes can be used. Other types of biometric identification such as retina scans, facial recognition, and fingerprints may be used.

Upon authentication of the personal ID and/or voice as indicated in block 102, the prospective participant can be provided prompts, such voice prompts, that announce the available conferences. Rather than or in addition to voice prompts, text prompts or any other type of prompts can be provided.

If there is more than one conference scheduled for the prospective participant, the prospective participant can select the desired conference call via voice response. Rather than or in addition to voice response, other communications such as DTMF tones or text input can be used by the prospective participant to select the desired conference call.

The prospective participant can be allowed to enter a conference ID, so as to join a meeting that might not be known by the system, e.g., by the conference server. In this manner the prospective participant can join a conference call that is not announced by the conference server.

The conference server can be pre-programmed with a prospective participant's schedule or calendar and/or the conference server can access the prospective participant's calendar. The conference server can access the prospective participant's meeting information automatically (e.g. by looking into the prospective participant's Microsoft Outlook calendar or any other source for meeting invitations). The prospective participant or an administrator can also submit the meeting information to the conference server, such as when the meeting is scheduled, via the conference system itself. The server can also query appropriate databases to obtain prospective participant's conference invitations after the prospective participant called the conference server.

Figure 2:
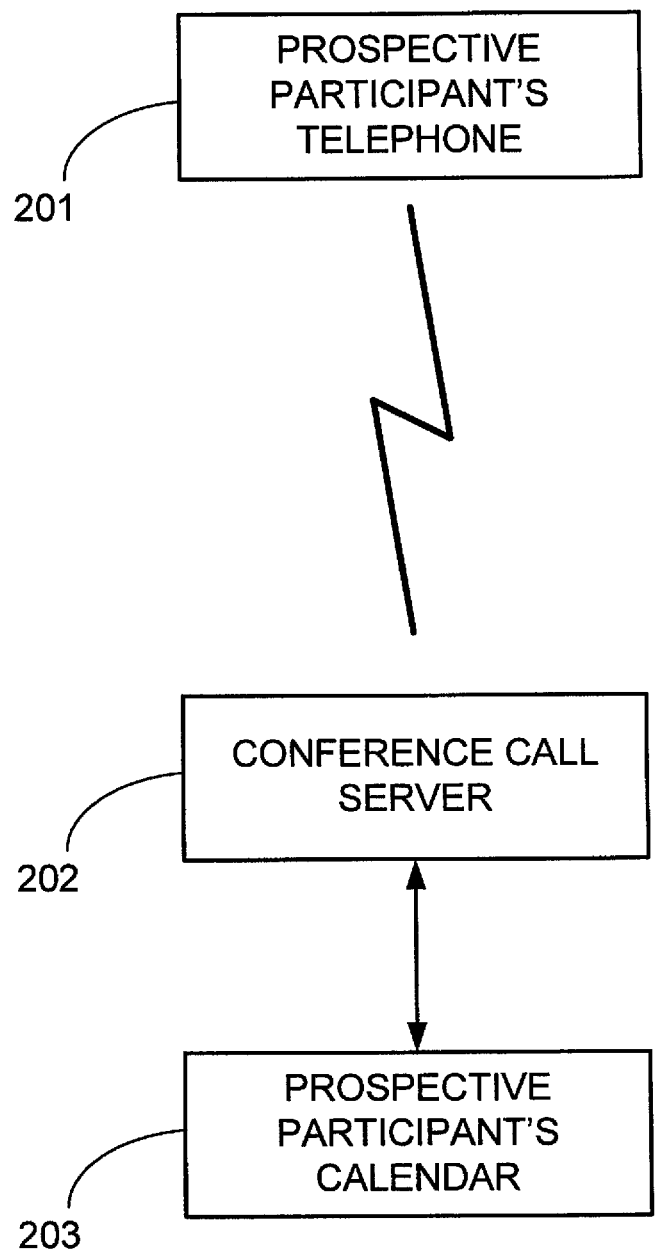
FIG. 2 is a block diagram showing a system according to an example of an embodiment.

Referring now to FIG. 2, a prospective participant can use a telephone 201 to contact a conference call server 202. The telephone can be a cellular telephone, a land-line telephone, an Internet telephone, a satellite telephone, or any other desired type of telephone. Thus, a prospective participant can, for example, provide a personal ID via a telephone network (such as a cellular telephone network) or a data network (such as the Internet). Providing the personal ID and participating in the conference call can be accomplished using either time division multiplexing (TDM), Internet Protocol (IP), or any other method.

The personal ID can be provided by using a web interface. The web interface can be accesses with a computer (such as a laptop computer, a notebook computer, or a pocket PC), a web enabled telephone, or any other device.

The conference call server 202 can communicate with the prospective participant's calendar 203. Thus, information regarding what conference calls the prospective participant has been invited to join can be obtained from the prospective participant's calendar as discussed above. This information can be used as discussed above to facilitate access of the prospective participant to a conference call.

Figure 3:
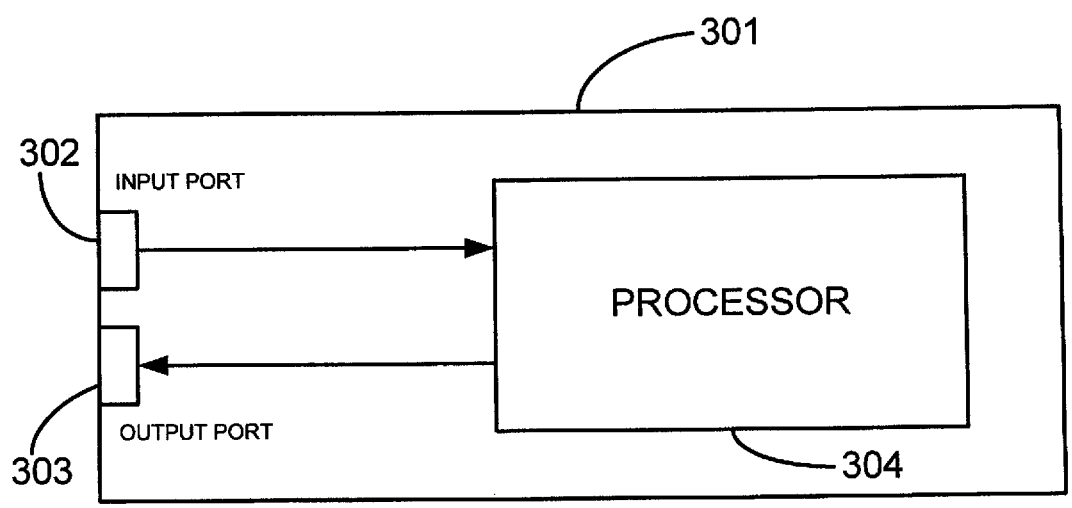
FIG. 3 is a block diagram showing a device according to an example of an embodiment.

Referring now to FIG. 3, according to particular embodiments of the present invention, a device such as a call server 301 receives information representative of a telephone call from a prospective participant in a conference call. The information can be received via an input port 302. The information can be communicated to a processor 304. Processor 304 can also be in communication with output port 303.

Input port 302 and output port 303 can be configured to communicate via a telephone network, a data network, or any other type of network. Input port 30 and output port 303 can be configured to communicate either analog signals or digital signals.

Processor 304 can be a general purpose microprocessor, for example. Processor 304 can be any other type of processor, include a custom microprocessor or a processor that is dedicated solely to the functionality discussed herein.

Processor 304 can be configured to use a prospective participant's personal ID and/or voice for authentication. Processor 304 can also be configured to access the prospective participant's electronic calendar, to present conference call choices from the participant's electronic calendar to a prospective participant, and add the prospective participant to a selected conference call.

Conference calls can include audio conference calls, audio/video conference calls, or any other desired type of conference calls. Any number of participants may participate in the conference calls.

Particular embodiments can be used for web access to conference calls, web seminars, and/or other web based meetings. Such access can be via any device that facilitates web access and thus particular embodiments are not limited to implementation in telephones.

According to particular embodiments, there can be a link between a conference participant's calendar system and conference server. Communication via this link (such as communications containing information regarding a person's calendar) can be initiated, either manually or automatically (such as periodically) by either a conference server, a device associated with a conference server, or the device upon which schedule information is stored. This is in contrast to contemporary conference servers, which only keep track of the conference call initiator and the requested resources.

In view of the forgoing, particular embodiments provide a way for conference call participants to join a conference without knowing the conference ID at the time of calling in. This is made possible because the conference server knows about the participants and because participants can call in to a common conference access number. This can be useful for voice only participants who lack access to a web interface. Particular embodiments can allow a prospective participant voice conference access without having to access a computer.

According to particular embodiments, a conference system can have access to and take advantage of a prospective participant's conference invitation information. A prospective participant can access a conference system using the prospective participant's personal ID without looking up a specific conference ID.

As those skilled in the art will appreciate, a single-use conference ID must be obtained according to contemporary practice, such as from a conference administrator, for each separate conference. Obtaining the conference ID according to contemporary practice can be undesirably time consuming and inconvenient.

By way of contrast, the personal ID of particular embodiments, like a PIN number, can be a number that the user memorizes. The personal ID can thus always be handy and ready for use. The use of a personal ID can eliminate the need to undesirably spend time obtaining conference ID's. Thus, particular embodiments provide prospective participants with a convenient and consistent method for joining conference calls.

The calendar does not have to be an electronic calendar. The calendar can be any type of calendar. For example, the calendar can be a paper calendar. In this instance, a person can be queried (such as via email) by the conference server regarding the calendar and the person can provide information (such as via email or web page input) regarding the calendar to the conference server.

Therefore, it should be understood that the invention can be practiced with modification and alteration within the spirit and scope of the appended claims. The description is not intended to be exhaustive or to limit the invention to the precise form disclosed. It should be understood that the invention can be practiced with modification and alteration and that the invention be limited only by the claims and the equivalents thereof.

What is claimed is:

1. A method comprising:

receiving, by a conference server, an initial contact from a prospective participant;

authenticating, by the conference server, the prospective participant by the use of a reusable personal identification (ID);

determining, by the conference server, multiple conference calls associated with the prospective participant based at least in part on the reusable personal identification (ID);

receiving, by the conference server, information representative of the prospective participant's scheduled conferences from the prospective participant's calendar, the information being used by the conference server to facilitate determination of whether or not the prospective participant is authorized to join the multiple conference calls;

communicating, by the conference server, information on the multiple conference calls to the prospective participant so that the prospective participant can select which conference call to join;

receiving, by the conference server, a selection by the prospective participant on which conference call to join; and adding, by the conference server, the prospective participant to a selected conference call.

2. The method as recited in claim 1, wherein the prospective participant provides the reusable personal identification (ID) to the conference server via a telephone.

3. The method as recited in claim 1, wherein the prospective participant provides the reusable personal identification (ID) to the conference server via a data network.

4. The method as recited in claim 1, wherein the prospective participant provides the reusable personal identification (ID) to the conference server via a web interface.

5. The method as recited in claim 1, further comprising querying a data base of authorized participants' identifications (IDs), by the conference server, to determine if the reusable personal identification (ID) is listed in the database.

6. The method as recited in claim 1, further comprising receiving, by the conference server, information regarding the prospective participant from the prospective participant's calendar, the information being used by the conference server to facilitate determination of whether or not the prospective participant is authorized to join the multiple conference calls.

7. The method as recited in claim 1, further comprising at least one of a user or an administrator submitting meeting information to the conference server.

8. A device comprising:
   an input port;
   an output port;
   a processor in communication with the input port and the output port, the processor being configured to:
   receive an initial contact from a prospective participant;
   authenticate the prospective participant using the prospective participant's reusable personal identification (ID);
   determine multiple conference calls associated with the prospective participant based at least in part on the reusable personal identification (ID);
   communicate information representative of the prospective participant's scheduled conferences from the prospective participant's calendar to the processor, the information being used to facilitate determination of whether or not the prospective participant is authorized to join the multiple conference calls;
   communicate information on the multiple conference calls to the prospective participant so that the prospective participant can select which conference call to join;
   receive a selection by the prospective participant on which conference call to join; and
   add the prospective participant to a selected conference call.

9. The device as recited in claim 8, wherein the input port is configured to receive the prospective participant's personal identification (ID) via a telephone network.

10. The device as recited in claim 8, wherein the input port is configured to receive the prospective participant's personal identification (ID) via a data network.

11. The device as recited in claim 8, wherein the input port is configured to receive the prospective participant's personal identification (ID) via the Internet.

12. The device as recited in claim 8, wherein the processor is further configured to determine if the prospective participant's reusable personal identification (ID) is listed in a database of authorized participants' identifications (IDs).

13. The device as recited in claim 8, wherein the processor is configured to facilitate access of the prospective participant to a selected one of a plurality of different conference calls.

14. The device as recited in claim 8, wherein the processor is configured to facilitate communication of information regarding the prospective participant from the prospective participant's calendar to the processor, the information being used to facilitate determination of whether or not the prospective participant is authorized to join the multiple conference calls.

15. The device as recited in claim 8, wherein the processor is configured to facilitate at least one of a user or an administrator submitting meeting information to the processor.

* * * * *